United States Patent
Shahin et al.

(10) Patent No.: US 7,963,329 B2
(45) Date of Patent: Jun. 21, 2011

(54) RECOVERY AND RECYCLING OF CHEMICALS IN CHEMICAL FLOODING PROCESS

(75) Inventors: Gordon Thomas Shahin, Bellaire, TX (US); Joseph Michael Redican, Pearland, TX (US)

(73) Assignee: Shell Oil Company, Houston, TX (US)

( * ) Notice: Subject to any disclaimer, the term of this patent is extended or adjusted under 35 U.S.C. 154(b) by 128 days.

(21) Appl. No.: 12/343,638

(22) Filed: Dec. 24, 2008

(65) Prior Publication Data

US 2009/0281003 A1    Nov. 12, 2009

Related U.S. Application Data

(60) Provisional application No. 61/017,862, filed on Dec. 31, 2007.

(51) Int. Cl.
| | |
|---|---|
| *E21B 43/16* | (2006.01) |
| *E21B 43/00* | (2006.01) |
| *E21B 43/22* | (2006.01) |
| *E21B 43/26* | (2006.01) |
| *C09K 8/68* | (2006.01) |
| *C09K 8/10* | (2006.01) |
| *C09K 8/60* | (2006.01) |
| *C09K 8/588* | (2006.01) |
| *C09K 8/584* | (2006.01) |

(52) U.S. Cl. ............ 166/268; 166/245; 166/270.1; 166/305.1; 507/209; 507/216; 507/219; 507/221; 507/253; 507/255; 507/256

(58) Field of Classification Search ............ 507/219, 507/209, 213, 216, 221, 224, 230, 253, 255, 507/256; 166/245, 268, 270.1, 305.1
See application file for complete search history.

(56) References Cited

U.S. PATENT DOCUMENTS
4,706,749 A * 11/1987 Hayes et al. ............ 166/267
* cited by examiner

*Primary Examiner* — Timothy J. Kugel
*Assistant Examiner* — Atnaf Admasu
(74) *Attorney, Agent, or Firm* — Richard B. Taylor

(57) ABSTRACT

A method including a) injecting into the formation an aqueous solution containing a polymer and a surfactant to create a organic phase and a aqueous phase, the surfactant being capable of reducing the interfacial tension between the phases to less than 1 dyne/cm; b) recovering a portion of the organic and aqueous phases containing at least a portion of the polymer and surfactant components and a portion of native petroleum surfactants generated in the porous formation; c) adjusting the conditions of the recovered portions to force a portion of the polymer and surfactant from one phase into the other phase by use of chemical, physical, electrical or gravitational means or a combination of said means; d) separating the polymer- and surfactant-containing phase; e) concentrating the polymer and surfactant components in the separated phase; and f) re-injecting at least a portion of the concentrated polymer and surfactant components into the formation.

20 Claims, No Drawings

RECOVERY AND RECYCLING OF CHEMICALS IN CHEMICAL FLOODING PROCESS

This application claims the benefit of U.S. Provisional application No. 61/017,862, filed Dec. 31, 2007, which is incorporated herein by reference.

FIELD OF INVENTION

The present invention generally relates to methods for recovery of hydrocarbons from subterranean reservoirs. More particularly, embodiments described herein relate to methods of enhanced hydrocarbon recovery using chemical means, such as the use of surfactants, and to methods of recovering and recycling such chemicals.

DESCRIPTION OF RELATED ART

It is well known that petroleum found in subterranean reservoirs may be recovered by many different methods. The primary method of petroleum recovery is natural forces such as pressure, either by the petroleum itself or by the presence of gases, whereby petroleum is forced from the subterranean reservoir to the surface and recovered. Due to declining pressure in the reservoir, additional petroleum in the reservoir may be recovered by a secondary process in which water is forced into the reservoir to provide the pressure necessary to force the petroleum from the reservoir to the surface.

At some point in the recovery of petroleum, it becomes more costly to use the water pumped in relative to the amount of oil that is recovered. Since a relatively large amount of petroleum may still be present in the reservoir, a tertiary method may be used to recover the remaining petroleum. The tertiary method or the enhanced oil recovery method includes many different methods. For example, one tertiary recovery method may be thermal in nature where steam is pumped into the reservoir to force the oil to the surface. However, some oil may be lost due to burning and, by combining the cost of the lost oil with the cost of the equipment and energy necessary to form the steam, may be uneconomic to operate. A second tertiary recovery method may comprise a fire flood method in which a portion of oil is ignited to create gases as well as reducing the viscosity of the heavy crude with a concomitant increase in pressure to force the oil from the reservoir. However, as in the method previously discussed, the drawback to this method is in the fact that some of the oil is being destroyed, thus increasing the cost of the operation. A third method for enhanced oil recovery is by the use of carbon dioxide to provide the pressure required to force the oil to the surface. In this method, the carbon dioxide is pumped into the oil reservoir to dissolve some of the heavies present which, in turn, will reduce the viscosity and allow the oil to reach the surface. The disadvantage when utilizing carbon dioxide is the requirement for relatively expensive equipment to produce the carbon dioxide. In addition, the method is dependent upon the ready availability of carbon dioxide. Yet another method for enhanced oil recovery is the use of chemicals such as water-soluble polymers including polyacrylamides and biopolymers. These polymers will increase the viscosity of the water in the solution and render the mobility ratio of water to oil more favorable, where the solution will act more favorably as a plug.

Another enhanced oil recovery method is utilizing surfactants as a plug, where the oil in the reservoir may be recovered by injecting an aqueous fluid containing a surfactant or a combination of surfactants along with other compounds into the reservoir. The use of surfactants in this system is necessary inasmuch as water alone does not displace petroleum with a relatively high degree of efficiency. This is due to the fact that water and oil are relatively immiscible and, in addition, the interfacial tension between water and oil is relatively high. The use of surfactants will lower or reduce the interfacial tension between the water and the oil, thus reducing the force that retains the oil that has been trapped in the reservoir.

There are many patents that describe enhanced oil recovery ("EOR") utilizing chemical surfactants and polymers, including among others U.S. Pat. Nos. 3,508,611, 3,823,777, 3,981,361, 4,058,467, 4,203,491, 4,232,738, 4,362,212, 4,411,816, 4,458,755, 4,493,371, 4,501,675, 4,502,541, 4,799,547, 5,031,698, 5,068,043, 6,022,834, 6,613,720, 6,989,355 and Canadian Pat. No. 1,169,759. As indicated in SPE Paper No. 7053 presented at a symposium on improved methods for oil recovery in April 1978, two essential criteria must be met for successful recovery of residual oil by chemical flooding: (1) very low interfacial tension between the chemical bank and the residual oil and between the chemical bank and the drive fluid, and (2) small surfactant retention losses to the reservoir rock. The paper relates to the phase behavior of such a chemical bank (or microemulsion or aqueous surfactant system) as a function of salinity and describes how the salinity of the drive water or fluid (or mobility buffer fluid) tends to control the amount of the surfactant retention.

Various surfactant floods have been proposed as means for recovering additional quantities of oil over that recoverable by conventional water flooding. Synthetic surfactants are expensive and the total amount of synthetic surfactant employed in a given waterflood operation is generally quite high because of the very large total amount of water which has to be introduced into a given partially depleted oil-bearing formation treated by the waterflood technique. This raises the cost of recovery to a figure that is sometimes exorbitant and frequently uneconomical because of the relatively high price of the surfactant, particularly when the total cost of the waterflood operation is compared with the amount of oil recovered by the use of this technique. It is clear that one of the major issues with the use of surfactants and surfactant/polymer systems is the cost, since the surfactants and polymers are typically dissipated in the reservoir and are not recovered. In order to reduce those costs, there have been references to the possibility of reusing produced chemicals in alkaline/surfactant/polymer floods. However, such references do not teach an effective means for recovery and recycle of such chemicals, nor do they teach the advantages for concentration and optimization. See Wang et al, "Detection and Reuse of the Produced Chemicals in Alkaline-Surfactant-Polymer Floods", SPE Paper No. 84075, presented at the SPE Annual Technical Conference and Exhibition, October 2003.

What has now been found is a novel process for recovery, recycling and reuse of such chemicals, resulting in much improved costs along with minimizing environment impact, risks and exposure to such chemicals.

BRIEF SUMMARY OF THE INVENTION

The present invention relates to an improved process for recovering hydrocarbons from a formation following the primary (and secondary) recovery operations. In one embodiment, the present invention relates to a method of recovering petroleum oil from a subterranean, petroleum-containing, porous formation, penetrated by at least one injection well and by at least one production well, said petroleum-containing formation having been previously subjected to at least primary recovery operations, the method comprising:

a. injecting into the formation an aqueous solution containing a polymer component and a surfactant component resulting in the creation of a continuous organic phase and a continuous aqueous phase in the formation, wherein the surfactant component is capable of reducing the interfacial tension between the continuous organic phase and the continuous aqueous solution to less than 1 dyne/cm;

b. recovering from the production well a portion of the organic phase and aqueous phase containing at least a portion of polymer and surfactant components that are not adsorbed or consumed in the formation along with a portion of native petroleum surfactants generated in the porous formation;

c. adjusting the conditions of the recovered organic phase and aqueous phase in order to force at least a portion of the polymer components and surfactant components from the organic phase into the aqueous phase by use of chemical, physical, electrical or gravitational means or a combination of such means;

d. separating the resulting aqueous phase;

e. concentrating the polymer components and surfactant components in the separated aqueous phase to the desired concentration; and f. re-injecting at least a portion of the concentrated polymer components and surfactant components into the formation.

In an alternative embodiment, the present invention relates to a method of recovering petroleum oil from a subterranean, petroleum-containing, porous formation, penetrated by at least one injection well and by at least one production well, said petroleum-containing formation having been previously subjected to at least primary recovery operations, the method comprising:

a. injecting into the formation an aqueous solution containing a polymer component and a surfactant component resulting in the creation of a continuous organic phase and a continuous aqueous phase in the formation, wherein the surfactant component is capable of reducing the interfacial tension between the continuous organic phase and the continuous aqueous solution to less than 1 dyne/cm;

b. recovering from the production well a portion of the organic phase and aqueous phase containing at least a portion of polymer and surfactant components that are not adsorbed or consumed in the formation along with a portion of native petroleum surfactants generated in the porous formation;

c. adjusting the conditions of the recovered organic phase and aqueous phase in order to force at least a portion of the polymer component and surfactant component from the aqueous phase into the organic phase by use of chemical, physical, electrical or gravitational means or a combination of means;

d. separating the resulting organic phase;

e. washing the separated organic phase with fresh water in order to remove a majority of the polymer components and surfactant components from the organic phase into the resulting water phase;

f. separating the resulting water phase containing the polymer components and surfactant components from the organic phase;

g. concentrating the polymer components and surfactant components in the separated water phase to the desired concentration; and h. re-injecting at least a portion of the concentrated polymer components and surfactant components into the formation.

The two alternatives are similar, with one alternative involving first recovering the utilized polymer and surfactant components in the organic phase and the other first recovering the utilized polymer and surfactant components in the aqueous phase. The means used to drive the desired components into one phase from the other phase include chemical, physical, electrical or gravitational means, including combinations thereof. Chemical means include adjusting the pH, changing the salinity, and adding a solvent with advantageous partitioning coefficients. Physical means include changing the temperature, distillation and separation of the boiling ranges, changing the pressure of the stream, by use of a filtration device or the use of molecular size separators like mole sieves. Electrical means include the use of an electrical field in order to separate the surfactant and/or polymer using electrochemical means. Gravitational means include the use of separators and centrifuges, and also includes dissolved air floatation devices and clarifiers.

As shown below, the present invention results in much improved costs along with minimizing environment impact, risks and exposure.

DETAILED DESCRIPTION OF THE PREFERRED EMBODIMENTS

Hydrocarbons may be produced from hydrocarbon formations through wells penetrating a hydrocarbon containing formation. "Hydrocarbons" are generally defined as molecules formed primarily of carbon and hydrogen atoms. Hydrocarbons may also include other elements, such as, but not limited to, halogens, metallic elements, nitrogen, oxygen and/or sulfur. Hydrocarbons derived from a hydrocarbon formation may include, but are not limited to, kerogen, bitumen, pyrobitumen, asphaltenes, oils or combinations thereof. Hydrocarbons may be located within or adjacent to mineral matrices within the earth. Matrices may include, but are not limited to, sedimentary rock, sands, carbonates, diatomites and other porous media.

A "formation" includes one or more hydrocarbon containing layers, one or more non-hydrocarbon layers, an overburden and/or an underburden. An "overburden" and/or an "underburden" includes one or more different types of impermeable materials. For example, overburden/underburden may include rock, shale, mudstone, or wet/tight carbonate (i.e., an impermeable carbonate without hydrocarbons). For example, an underburden may contain shale or mudstone. In some cases, the overburden/underburden may be somewhat permeable. For example, an underburden may be composed of a permeable mineral such as sandstone or limestone. In some embodiments, at least a portion of a hydrocarbon containing formation may exist at less than 1000 feet below the earth's surface.

Properties of a hydrocarbon containing formation may affect how hydrocarbons flow through an underburden/overburden to one or more production wells. Properties include, but are not limited to, porosity, permeability, pore size distribution, surface area, salinity or temperature of formation. Overburden/underburden properties in combination with hydrocarbon properties, such as, capillary pressure (static) characteristics and relative permeability (flow) characteristics may effect mobilization of hydrocarbons through the hydrocarbon containing formation.

Permeability of a hydrocarbon containing formation may vary depending on the formation composition. A relatively permeable formation may include heavy hydrocarbons entrained in, for example, sand or carbonate. "Relatively permeable," as used herein, refers to formations or portions thereof, that have an average permeability of 10 millidarcy or more. "Relatively low permeability" as used herein, refers to formations or portions thereof that have an average permeability of less than about 10 millidarcy. One darcy is equal to about 0.99 square micrometers. An impermeable portion of a formation generally has a permeability of less than about 0.1 millidarcy. In some cases, a portion or all of a hydrocarbon portion of a relatively permeable formation may include predominantly heavy hydrocarbons and/or tar with no supporting mineral grain framework and only floating (or no) mineral matter (e.g., asphalt lakes).

The terms "enhanced oil recovery" or "EOR" as used herein refer to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells.

Fluids (e.g., gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. In an embodiment, a first boundary may form between a water layer and underburden. A second boundary may form between a water layer and a hydrocarbon layer. A third boundary may form between hydrocarbons of different densities in a hydrocarbon containing formation. Multiple fluids with multiple boundaries may be present in a hydrocarbon containing formation, in some embodiments. It should be understood that many combinations of boundaries between fluids and between fluids and the overburden/underburden may be present in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult. Quantification of the interactions (e.g., energy level) at the interface of the fluids and/or fluids and overburden/underburden may be useful to predict mobilization of hydrocarbons through the hydrocarbon containing formation.

Quantification of energy required for interactions (e.g., mixing) between fluids within a formation at an interface may be difficult to measure. Quantification of energy levels at an interface between fluids may be determined by generally known techniques (e.g., spinning drop tensiometer). Interaction energy requirements at an interface may be referred to as interfacial tension. The terms "interfacial tension" or "IFT" as used herein refer to the surface tension between oil and water. To achieve high enhanced oil recovery, it is necessary to reduce the interfacial tension between the oil and the water in the reservoir to less than about 1 dyne/centimeter. A high interfacial tension value (e.g., greater than about 10 dynes/cm) may indicate the inability of one fluid to mix with a second fluid to form a fluid emulsion. As used herein, an "emulsion" refers to a dispersion of one immiscible fluid into a second fluid by addition of a composition that reduces the interfacial tension between the fluids to achieve stability. The term "micro-emulsion" as used herein refers to a stable, micellar solution of oil, water, a surfactant and optionally one or more electrolytes. Micro-emulsions are defined as those emulsions having an average particle size of about a few nanometers in diameter. The inability of the fluids to mix may be due to high surface interaction energy between the two fluids. Low interfacial tension values (e.g., less than about 1 dyne/cm) may indicate less surface interaction between the two immiscible fluids. Less surface interaction energy between two immiscible fluids may result in the mixing of the two fluids to form an emulsion. Fluids with low interfacial tension values may be mobilized to a well bore due to reduced capillary forces and subsequently produced from a hydrocarbon containing formation.

Fluids in a hydrocarbon containing formation may wet (e.g., adhere to an overburden/underburden or spread onto an overburden/underburden in a hydrocarbon containing formation). As used herein, "wettability" refers to the preference of a fluid to spread on or adhere to a solid surface in a formation in the presence of other fluids. Methods to determine wettability of a hydrocarbon formation are described by Craig, Jr. in "The Reservoir Engineering Aspects of Waterflooding", 1971 Monograph Volume 3, Society of Petroleum Engineers. In an embodiment, hydrocarbons may adhere to sandstone in the presence of gas or water. An overburden/underburden that is substantially coated by hydrocarbons may be referred to as "oil wet." An overburden/underburden may be oil wet due to the presence of polar and/or heavy hydrocarbons (e.g., asphaltenes) in the hydrocarbon containing formation. Formation composition (e.g., silica, carbonate or clay) may determine the amount of adsorption of hydrocarbons on the surface of an overburden/underburden. In some embodiments, a porous and/or permeable formation may allow hydrocarbons to more easily wet the overburden/underburden. A substantially oil wet overburden/underburden may inhibit hydrocarbon production from the hydrocarbon containing formation. In certain embodiments, an oil wet portion of a hydrocarbon containing formation may be located at less than 1000 feet below the earth's surface. For example, oil wet formations may be located in Canada, China, Wyoming, Oklahoma and Louisiana.

A hydrocarbon formation may include water. Water may interact with the surface of the underburden. As used herein, "water wet" refers to the formation of a coat of water on the surface of the overburden/underburden. A water wet overburden/underburden may enhance hydrocarbon production from the formation by preventing hydrocarbons from wetting the overburden/underburden. In certain embodiments, a water wet portion of a hydrocarbon containing formation may include minor amounts of polar and/or heavy hydrocarbons.

Water in a hydrocarbon containing formation may contain minerals (e.g., minerals containing barium, calcium, or magnesium) and mineral salts (e.g., sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness," as used herein, refers to a concentration of divalent ions (e.g., calcium, magnesium) in the water. Water salinity and hardness may be determined by generally known methods (e.g., conductivity, titration). As used herein, "high salinity water" refers to water that has greater than about 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation. Hydrocarbons and low salinity water may form a well dispersed emulsion due to a low interfacial tension between the low salinity water and the hydrocarbons. Production of a flowable emulsion (e.g., hydrocarbons/water mixture) from a hydrocarbon containing formation may be more economically viable to a producer. As used herein, "low salinity water" refers to water salinity in a hydrocarbon containing formation that is less than about 20,000 parts per million (ppm) total dissolved solids based on sodium chloride. In some embodiments, hydrocarbon containing formations may include water with a salinity of less than about 13,000 ppm. In certain embodiments, hydrocarbon containing formations may include water with a salinity ranging from about 3,000 ppm to about 10,000 ppm. In other embodiments, salinity of the water in hydrocarbon containing formations may range from about 5,000 ppm to about 8,000 ppm.

A hydrocarbon containing formation may be selected for treatment based on factors such as, but not limited to, thickness of hydrocarbon containing layers within the formation, assessed liquid production content, location of the formation, salinity content of the formation, temperature of the formation, and depth of hydrocarbon containing layers. Initially, natural formation pressure and temperature may be sufficient to cause hydrocarbons to flow into well bores and out to the surface. Temperatures in a hydrocarbon containing formation may range from about 25° C. to about 300° C. A hydrocarbon formation of a depth less than 1000 feet below the earth's surface may exhibit a temperature less than 50° C. In some embodiments, a hydrocarbon formation temperature of a depth less than 1000 feet below the earth's surface may be less than 40° C. In other embodiments, a hydrocarbon formation of a depth less than 1000 feet below the earth's surface temperature may be less than 30° C. As hydrocarbons are produced from a hydrocarbon containing formation, pressures and/or temperatures within the formation may decline. Various forms of artificial lift (e.g., pumps, gas injection) and/or heating may be employed to continue to produce hydrocarbons from the hydrocarbon containing formation. Production of desired hydrocarbons from the hydrocarbon containing formation may become uneconomical as hydrocarbons are depleted from the formation.

Mobilization of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. In an embodiment, capillary forces may be overcome by increasing the pressures within a hydrocarbon containing formation. In other embodiments, capillary forces may be overcome by reducing the interfacial tension between fluids in a hydrocarbon containing formation. The ability to reduce the capillary forces in a hydrocarbon containing formation may depend on a number of factors, including, but not limited to, the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (e.g., brine, steam), gases, polymers, monomers or any combinations thereof to the hydrocarbon formation to increase mobilization of hydrocarbons.

Production from a hydrocarbon containing formation may be enhanced by treating the hydrocarbon containing formation with a polymer and/or monomer that may mobilize hydrocarbons to one or more production wells. The polymer and/or monomer may reduce the mobility of the water phase in pores of the hydrocarbon containing formation. The reduction of water mobility may allow the hydrocarbons to be more easily mobilized through the hydrocarbon containing formation. Polymers include, but are not limited to, polyacrylamides, partially hydrolyzed polyacrylamide, polyacrylates, ethylenic copolymers, biopolymers, carboxymethylcellulose, polyvinyl alcohol, polystyrene sulfonates, polyvinylpyrrolidone, AMPS (2-acrylamide-2-methyl propane sulfonate) or combinations thereof. Examples of ethylenic copolymers include copolymers of acrylic acid and acrylamide, acrylic acid and lauryl acrylate, lauryl acrylate and acrylamide. Examples of biopolymers include xanthan gum and guar gum. In some embodiments, polymers may be crosslinked in situ in a hydrocarbon containing formation. In other embodiments, polymers may be generated in situ in a hydrocarbon containing formation. Polymers and polymer preparations for use in oil recovery are described in U.S. Pat. No. 6,427,268 to Zhang et al., entitled "Method For Making Hydrophobically Associative Polymers, Methods of Use and Compositions;" U.S. Pat. No. 6,439,308 to Wang, entitled "Foam Drive Method;" U.S. Pat. No. 5,654,261 to Smith, entitled, "Permeability Modifying Composition For Use In Oil Recovery;" U.S. Pat. No. 5,284,206 to Surles et al., entitled "Formation Treating;" U.S. Pat. No. 5,199,490 to Surles et al., entitled "Formation Treating" and U.S. Pat. No. 5,103,909 to Morgenthaler et al., entitled "Profile Control In Enhanced Oil Recovery," all of which are incorporated by reference herein.

In an embodiment, addition of an additive may increase the solubility of a hydrocarbon recovery composition in an organic or hydrocarbon phase. Alternatively, addition of an additive may increase solubility of the hydrocarbon recovery composition in the aqueous or water phase. As used herein, a molecule soluble in an organic phase may be referred to as "lipophilic." A molecule soluble in an aqueous phase, as used herein, may be referred to as "hydrophilic." The effectiveness of the additive may be measured by combining the additive with a hydrocarbon and water mixture and determining if an emulsion is formed. The effectiveness of the additive to form an emulsion may be reported as a hydrophile-lipophile balance (HLB) number. Typically, HLB numbers range between about 1 and about 40. A high HLB number may indicate that a hydrocarbon-in-water emulsion is formed. A low HLB number may indicate that a water-in-hydrocarbon emulsion is formed. As used herein, a "nonionic additive" refers to an additive that exhibits a hydrophile-lipophile balance (HLB) number of less than 10.

In the present invention a chemical surfactant and associated additives are provided to the hydrocarbon containing formation. In an embodiment, a composition may include one or more nonionic additives (e.g., alcohols, ethoxylated alcohols, nonionic surfactants and/or sugar based esters) and one or more anionic surfactants (e.g., sulfates, sulfonates, ethoxylated sulfates, and/or phosphates). This may be referred to as a "hydrocarbon recovery composition".

A hydrocarbon recovery composition may interact with hydrocarbons in at least a portion of the hydrocarbon containing formation. Interaction with the hydrocarbons may reduce an interfacial tension of the hydrocarbons with one or more fluids in the hydrocarbon containing formation. In other embodiments, a hydrocarbon recovery composition may reduce the interfacial tension between the hydrocarbons and an overburden/underburden of a hydrocarbon containing formation. Reduction of the interfacial tension may allow at least a portion of the hydrocarbons to mobilize through the hydrocarbon containing formation.

The ability of a hydrocarbon recovery composition to reduce the interfacial tension of a mixture of hydrocarbons and fluids may be evaluated using known techniques. In an embodiment, an interfacial tension value for a mixture of hydrocarbons and water may be determined using a spinning drop tensiometer. An amount of the hydrocarbon recovery composition may be added to the hydrocarbon/water mixture and an interfacial tension value for the resulting fluid may be determined. A low interfacial tension value (e.g., less than about 1 dyne/cm) may indicate that the composition reduced at least a portion of the surface energy between the hydrocarbons and water. Reduction of surface energy may indicate that at least a portion of the hydrocarbon/water mixture may mobilize through at least a portion of a hydrocarbon containing formation.

A hydrocarbon recovery composition may be provided to the formation in an amount based on hydrocarbons present in a hydrocarbon containing formation. The amount of hydrocarbon recovery composition, however, may be too small to be accurately delivered to the hydrocarbon containing formation using known delivery techniques (e.g., pumps). To facilitate delivery of small amounts of the hydrocarbon recovery composition to the hydrocarbon containing formation, the hydrocarbon recovery composition may be combined with water and/or brine to produce an injectable fluid. An amount of a hydrocarbon recovery composition injected into hydrocarbon containing formation may be less than 0.5 wt. % of the total weight of the injectable fluid. In certain embodiments, an amount of a hydrocarbon recovery composition provided to a hydrocarbon containing formation may be less than 0.3 wt. % of the total weight of injectable fluid. In some embodiments, an amount of a hydrocarbon recovery composition provided to a hydrocarbon containing formation may be less than 0.1 wt. % of the total weight of injectable fluid. In other embodiments, an amount of a hydrocarbon recovery composition provided to a hydrocarbon containing formation may be less than 0.05 wt. % of the total weight of injectable fluid.

The hydrocarbon recovery composition may interact with at least a portion of the hydrocarbons in hydrocarbon layer. The interaction of the hydrocarbon recovery composition with hydrocarbon layer may reduce at least a portion of the interfacial tension between different hydrocarbons. The hydrocarbon recovery composition may also reduce at least a portion of the interfacial tension between one or more fluids (e.g., water, hydrocarbons) in the formation and the underburden, one or more fluids in the formation and the overburden or combinations thereof. In an embodiment, a hydrocarbon recovery composition may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. An interfacial tension value between the hydrocarbons and one or more fluids may be altered by the hydrocarbon recovery composition to a value of less than about 1 dyne/cm, preferably less than 0.1 dyne/cm. In some embodiments, an interfacial tension value between the hydrocarbons and other fluids in a formation may be reduced by the hydrocarbon recovery composition to be less than about 0.05 dyne/cm. An interfacial tension value between hydrocarbons and other fluids in a formation may be lowered by the hydrocarbon recovery composition to less than 0.001 dyne/cm, in other embodiments.

In certain embodiments, hydrocarbon containing formation may be pretreated with a hydrocarbon removal fluid. A hydrocarbon removal fluid may be composed of water, steam, brine, gas, liquid polymers, foam polymers, monomers or mixtures thereof. A hydrocarbon removal fluid may be used to treat a formation before a hydrocarbon recovery composition is provided to the formation. Hydrocarbon containing formation may be less than 1000 feet below the earth's surface, in some embodiments. A hydrocarbon removal fluid may be heated before injection into a hydrocarbon containing formation, in certain embodiments. A hydrocarbon removal fluid may reduce a viscosity of at least a portion of the hydrocarbons within the formation. Reduction of the viscosity of at least a portion of the hydrocarbons in the formation may enhance mobilization of at least a portion of the hydrocarbons to production well. After at least a portion of the hydrocarbons in hydrocarbon containing formation have been mobilized, repeated injection of the same or different hydrocarbon removal fluids may become less effective in mobilizing hydrocarbons through the hydrocarbon containing formation. Low efficiency of mobilization may be due to hydrocarbon removal fluids creating more permeable zones in hydrocarbon containing formation. Hydrocarbon removal fluids may pass through the permeable zones in the hydrocarbon containing formation and not interact with and mobilize the remaining hydrocarbons. Consequently, displacement of heavier hydrocarbons adsorbed to underburden may be reduced over time. Eventually, the formation may be considered low producing or economically undesirable to produce hydrocarbons.

In certain embodiments, injection of a hydrocarbon recovery composition after treating the hydrocarbon containing formation with a hydrocarbon removal fluid may enhance mobilization of heavier hydrocarbons adsorbed to underburden. The hydrocarbon recovery composition may interact with the hydrocarbons to reduce an interfacial tension between the hydrocarbons and underburden. Reduction of the interfacial tension may be such that hydrocarbons are mobilized to and produced from production well. Produced hydrocarbons from production well may include, in some embodiments, at least a portion of the components of the hydrocarbon recovery composition, the hydrocarbon removal fluid injected into the well for pretreatment, methane, carbon dioxide, ammonia, or combinations thereof. Adding the hydrocarbon recovery composition to at least a portion of a low producing hydrocarbon containing formation may extend the production life of the hydrocarbon containing formation. Hydrocarbon production from hydrocarbon containing formation may be increased by greater than about 50% after the hydrocarbon recovery composition has been added to hydrocarbon containing formation. Increased hydrocarbon production may increase the economic viability of the hydrocarbon containing formation.

In some embodiments, a hydrocarbon recovery composition may be added to a portion of hydrocarbon containing formation that may have an average temperature of less than 50° C. To facilitate delivery of an amount of the hydrocarbon recovery composition to the hydrocarbon containing formation, the hydrocarbon composition may be combined with water or brine to produce an injectable fluid. Less than about 0.5 wt % of the hydrocarbon recovery composition, based on the total weight of injectable fluid, may be injected into hydrocarbon containing formation through injection well. In certain embodiments, the concentration of the hydrocarbon recovery composition injected through injection well may be less than 0.3 wt. %, based on the total weight of injectable fluid. In some embodiments, the concentration of the hydrocarbon recovery composition may be less 0.1 wt. % based on the total weight of injectable fluid. In other embodiments, the concentration of the hydrocarbon recovery composition may be less 0.05 wt. % based on the total weight of injectable fluid.

Interaction of the hydrocarbon recovery composition with at least a portion of hydrocarbons in the formation may reduce at least a portion of an interfacial tension between the hydrocarbons and underburden. Reduction of at least a portion of the interfacial tension may mobilize at least a portion of hydrocarbons through hydrocarbon containing formation. Mobilization of at least a portion of hydrocarbons, however, may not be at an economically viable rate. In one embodiment, polymers may be injected into hydrocarbon formation through injection well, after treatment of the formation with a hydrocarbon recovery composition, to increase mobilization of at least a portion of the hydrocarbons through the formation. Suitable polymers include, but are not limited to, CIBA® ALCOFLOOD®, manufactured by Ciba Specialty Additives (Tarrytown, N.Y.), Tramfloc® manufactured by Tramfloc Inc. (Temple, Ariz.), and HE® polymers manufactured by Chevron Phillips Chemical Co. (The Woodlands, Tex.). Interaction between the hydrocarbons, the hydrocarbon recovery composition and the polymer may increase mobilization of at least a portion of the hydrocarbons remaining in the formation to production well.

The water utilized for preparing the aqueous mixture injected in the course of the practice of the invention is suitably substantially pure water, but may also very suitably contain dissolved solids, for instance, inorganic salts. Aqueous brines, such as seawater or a brine as is produced with oil from an underground reservoir, are commonly employed. The ethoxyacetate surfactant is very tolerant of the typical brine components, and brines containing substantial amounts of dissolved solids, e.g., those containing up to about 12% w of inorganic salts, are suitable in the invention. The alcohol ethoxyacetate surfactants useful in the invention are very soluble in water, and are soluble in, or form handleable dispersions with, typical brines.

Overall, the total volume of the aqueous surfactant mixture injected into the reservoir typically, but not necessarily, represents between about 1 and 25 percent of the pore volume of the reservoir.

The alkali to be used in the present process is preferably an alkali metal hydroxide, of which sodium hydroxide is particularly suitable, and/or one or more additional water-soluble basic salts which are capable of providing a pH of at least about 10 when dissolved in water, such as the alkali metal carbonates and/or bicarbonates, the alkali metal silicates, etc.

The most commonly used anionic surfactants in oil recovery are synthetic and natural alkyl benzene sulfonates, alkyl toluene sulfonates, alkyl xylene sulfonates, alkyl diphenyl sulfonates, alpha-olefin sulfonates, sulfonated or sulfated alkoxylated alkylphenols or mixtures of two or more of these surfactants. Many of the above mentioned surfactants can be easily synthesized by simultaneously alkylating and sulfonating the aromatics. An olefin sulfonic acid is used to simultaneously alkylate and sulfonate the aromatic compound. The aromatics that can be used include benzene, toluene, xylene(s), naphthalene, phenol, diphenylether as well as substituted derivatives of these such as alknylnapthhalenes, alkoxylated phenols, alkoxylated alkylphenols, etc. The olefin sulfonic acid can be linear or branched and of various chain lengths. Also included are surfactants where the sulfonate group is attached to the end of the alkyl chain. Other useful surfactants are internal olefin sulfonates, alcohol ethoxy-sulfates, alcohol ethoxylates, and petroleum sulfonates, such as those disclosed in U.S. Pat. No. 5,068,043, which disclosure is herein incorporated by reference.

A number of surfactants useful in the present invention are available from Shell Chemical Company, and include the following:

NEODENE® linear alpha and internal olefins (alkenes) are manufactured using the advanced Shell Higher Olefin Process (SHOP), which includes a controlled polymerisation (oligomerization) of ethylene in the presence of catalyst. These high purity olefins are produced in a wide variety of single carbon numbers and blends, ranging from C4 to C20+. The products available include pure 1-butene, 1-hexene and 1-octene as well as a range of blends that can be tailored to meet required specifications.

NEODOX® Alcohol Ethoxycarboxylates (AEC) alcohols are produced by an oxidative reaction of alcohol ethoxylate with air or oxygen. NEODOX AEC is used for enhanced oil recovery requiring good alkaline stability, electrolyte tolerance, good emulsification and temperature stability.

NEODOL® alcohols are polyethoxy aliphatic alcohol sulfate surfactants. NEODOL alcohols are high purity, high linearity primary alcohols containing 75-85% by weight normal alcohols.

LXS® surfactants are linear xylene sulfonates used for enhanced oil recovery.

AOS® sulfonates are Alpha Olefin Sulfonates used for enhanced oil recovery.

ENORDET® surfactants are alpha-olefin sulfonate surfactants used for enhanced oil recovery.

In the first step of the claimed process an aqueous solution containing a polymer component and a surfactant component are injected into the formation through the injection well. The polymer component is described above, along with the surfactant component. Preferred polymer components include galactomannan polymers; derivatized galactomannan polymers; xanthan gums; hydroxycelluloses; hydroxyalkyl celluloses; polyvinyl alcohol polymers; and polymers that are the product of a polymerization reaction comprising one or more monomers selected from the group consisting of vinyl pyrrolidone, 2-acrylamido-2-methylpropanesulfonic acid, acrylic acid and acrylamide. Most preferred are poly acrylamides and their derivatives and xanthan gums. Preferred surfactant components include alkyl aromatic sulfonates, olefin (branched or linear alpha or internal) sulfonates, branched or linear alcohol alkoxylates sulfonates, sulfates, or carboxylates, and alkoxylated alkyl phenols.

In an alternative embodiment, an alkaline component, such as sodium hydroxide, may also be injected with the polymer and surfactant. As a result a continuous organic phase and a continuous aqueous phase are created in the formation, wherein the surfactant component is capable of reducing the interfacial tension between the continuous organic phase and the continuous aqueous solution to less than 0.07 mN/m to 0.001 mN/m or 9×10-3 dyne/cm. This allows oil that is trapped by capillary forces to become mobilized and to be pushed out of the formation by the water and/water and polymer that follow.

In the second step of the claimed process a portion of the organic phase and aqueous phase is recovered from the production well. This stream will contain at least a portion of the polymer and surfactant components that are not adsorbed or consumed in the formation along with a portion of native petroleum surfactants generated in the porous formation. Native petroleum surfactants refer to the surfactants that are produced in the formation. It is known that crude petroleum contains varying amounts of surfactant-yielding materials. These have generally been thought of as being simply saponifiable materials such as petroleum acids that can react with alkaline materials to form soaps (i.e. surfactants) that reduce the interfacial tension between the crude petroleum and water.

In the third step of the preferred embodiment there are two alternatives, namely, the conditions of the recovered organic phase and aqueous phase can be adjusted so as to force at least a portion of the polymer component and surfactant component either from the aqueous phase into the organic phase or from the organic phase to the aqueous phase. In the preferred embodiments, there are a variety of means by which it is possible to force the chemical components from one phase to the other. These include the use of chemical, physical, electrical or gravitational means or a combination of means. Chemical means include adjusting the pH, changing the salinity, and adding a solvent with advantageous partitioning coefficients. Physical means include distillation and separation of the boiling ranges, changing the temperature of the stream, changing the pressure of the stream, by using a filtration device and the use of molecular size separators like mole sieves. Electrical means include the use of an electrical field in order to separate the surfactant and/or polymer using electrochemical forces. Gravitational means include the use of separators and centrifuges, and also includes dissolved air floatation unit and clarifiers Descriptions of many of these means are found in U.S. Pat. No. 6,613,720, herein incorporated by reference.

One preferred destabilizing method entails changing the pH of the stream. This can be done by adding either an alkaline pH modifier or an acidic pH modifier. Examples of alkaline pH modifiers that can be used to cause emulsion destabilization include alkali metal hydroxides, oxides, phosphates, carbonates and bicarbonates; alkaline earth oxides, phosphates, and carbonates; ammonium hydroxide, ammonium carbonate, and ammonium bicarbonate; alkali metal silicates, and base precursors such as ureas and substituted ureas, cyanates, alkylamines and certain alkanolamines, quaternary ammonium salts, ammonium salts and salts of a weak acid and a strong base, among others. Exemplary acidic pH modifiers include inorganic acids such as hydrochloric or hydrofluoric acid; organic acids such as citric, acetic, formic acid; and acid precursors such as hydrolyzable esters, acid anhydrides, sulfonates, organic halides, and salts of a strong acid and a weak base, among others. Preferred acid-producing chemical reactions that can be used to advantage in the preferred embodiments include those that rely on hydrolyzable esters as precursors. Esters can be hydrolyzed to form acid and alcohol. Exemplary esters include methyl, ethyl and propyl formates; methyl, ethyl and propyl acetates; dimethyl- or diethyl-oxalate, malonate, succinate, glutarate, adipate, pimelate, maleate and fumarate, among others. Preferred base-producing chemical reactions that can be used to destabilize the emulsion include those that rely on ureas and cyanates. Exemplary bases include urea, thiourea, methyl and ethyl ureas, dimethyl and diethyl ureas; tetramethyl urea, and sodium cyanate, among others.

Another preferred method entails adjusting the temperature of the stream. One example of a situation in which a change in temperature can be used to bring about the destabilization of an emulsion, is when a fluid composition comprising a stabilizing surfactant experiences a change in temperature such that the cloud point or phase inversion temperature of the stabilizing surfactant is reached. A change in temperature can also have indirect effects by, for example, affecting the solubility of other components of the fluid composition that can change the stabilizing surfactant's ability to stabilize the emulsion. For instance, an increase in temperature could increase the solubility of a slightly soluble salt present in the fluid composition, changing the salinity of the solution and affecting the stability of the emulsion. In addition, temperature accelerated reactions such as hydrolysis of certain surfactants or esters can be used to bring about the destabilization of an emulsion.

Another method entails distillation of the stream by heating the stream so that portions of it are above its boiling point. It is possible to separate the oil and or water, and the surfactant and/or polymer into separate streams based on their boiling points.

Another method entails adjusting the salinity of the stream. Exposure to a change in salinity of certain fluid compositions can also be used to destabilize certain emulsions used in the preferred embodiments. A change in salinity can be the result of dissolving salts or introducing salt solutions into the fluid composition.

Another destabilizing condition that can be employed is exposure to a pulse of ultrasonic energy. Such ultrasonic energy can be generated from an ultrasonic pulse. The ultrasonic pulse imparts a focused, high frequency energy to the solution, disrupting the emulsion. Some polymers such as high molecular weight polyacrylamides are susceptible to chain scission by the application of ultrasonic energy, and it is preferred that fluid compositions comprising such polymers not be employed in combination with ultrasonic energy for emulsion destabilization. Ultrasonic pulse sources (e.g., an ultrasonic horn) are known in the art.

Some emulsions can be formed using a mixture of stabilizing surfactants that have a net electrical charge. For example, using a mixture of a cationic surfactant with a nonionic surfactant to stabilize an emulsion can result in droplets of the discontinuous phase having a charge. Thus the charged droplets are subject to interaction with an electrical field that is imposed, like an electrophoretic process. Droplets migrating in the electrical field will tend to collide and coalesce, which results in breakage of micelles and release of chemical or biological agents sequestered in the discontinuous phase. The technology for applying electrical fields is known in the art. Thus, exposure to an electrical field can be a destabilizing condition for certain preferred methods, wherein the surfactant stabilized emulsion comprises a single surface active compound or a mixture of surface active compounds that have a net electrical charge.

If desired, to or more of the destabilizing conditions listed above can be used in combination to cause destabilization of the emulsion. For example, a destabilizing change in pH and a change in temperature can be effected simultaneously or sequentially in a fluid composition that comprises a stabilizing surfactant (or a mixture of stabilizing surfactants) that is sensitive to both destabilizing conditions.

Similarly, a change in pH, salinity, and temperature could be used in conjunction to destabilize an emulsion. For example, a fluid composition comprising a stabilizing surfactant sensitive to these changes and an ester that is hydrolyzed could be used in a hydrocarbon-bearing formation with a temperature greater than 250° F. Thus, in this example, changes in temperature, acid concentration, and salinity can all be factors that combine to destabilize the emulsion.

The choice of destabilizing condition is influenced by factors such as cost, ease of operation, efficiency/effectiveness, safety and environmental issues.

After forcing the desired chemical components from one phase to the other, it is necessary to recover the chemical components, and concentrate the chemical components to the desired level. For the situation where the chemical components have been concentrated into the organic phase, the following steps are next applied:

1. separating the resulting organic phase;
2. washing the separated organic phase with fresh water in order to remove a majority of the polymer components and surfactant components from the organic phase into the resulting water phase;
3. separating the resulting water phase containing the polymer components and surfactant components from the organic phase; and
4. concentrating the polymer components and surfactant components in the separated water phase to the desired concentration.

For the situation where the chemical components have first been concentrated into the aqueous phase, the following steps are next applied:

1. separating the resulting aqueous phase; and
2. concentrating the polymer components and surfactant components in said separated aqueous phase to the desired concentration.

Separating the aqueous phase from the organic phase may be readily done by use of a separator vessel, such as a clarifier, which allows heavier material to fall to the bottom of the vessel, where it can be drawn off by rotating arms, and lighter material to float to the top, where it can be collected by booms and/or weirs.

After the chemical components are recovered in an aqueous or water phase it is necessary to concentrate the chemical components to the desired concentration.

In the final step, at least a portion (preferably the entire amount) of the concentrated polymer and surfactant components are reinjected into the formation along with fresh amounts of polymer and surfactant as needed. By use of the present invention, it is possible to significantly reduce the overall cost of chemical flooding, along with protecting the environment.

In this patent, certain U.S. patents, U.S. patent applications and other materials (e.g., articles) have been incorporated by reference. The text of such materials is, however, only incorporated by reference to the extent that no conflict exists between such text and the other statements and drawings set forth herein. In the event of such conflict, any conflicting text in the incorporated materials is specifically not incorporated herein.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes can be made in the elements described herein without departing from the scope of the invention as described in the following claims. In addition, it is to be understood that features described herein independently may, in certain embodiments, be combined.

What is claimed is:

1. A method of recovering petroleum oil from a subterranean, petroleum-containing, porous formation, penetrated by at least one injection well and by at least one production well, said petroleum-containing formation having been previously subjected to at least primary recovery operations, comprising:
    a. injecting into said injection well an aqueous solution containing a polymer component and a surfactant component resulting in the creation of a continuous organic phase and a continuous aqueous phase in the formation, wherein said surfactant component is capable of reducing the interfacial tension between the continuous organic phase and the continuous aqueous phase to less than 1 dyne/cm;
    b. recovering from the production well a portion of the organic phase and a portion of the aqueous phase, at least one of said portions containing at least a portion of polymer and surfactant components that are not adsorbed or consumed in the formation along with a portion of native petroleum surfactants generated in the porous formation;
    c. adjusting the conditions of the recovered organic phase and aqueous phase in order to force at least a portion of the polymer components and surfactant components from the organic phase into the aqueous phase by use of chemical, physical, electrical or gravitational means or a combination of said means;
    d. separating the resulting aqueous phase;
    e. concentrating the polymer components and surfactant components in said separated aqueous phase to the desired concentration; and
    f. re-injecting at least a portion of the concentrated polymer components and surfactant components into the injection well.

2. The method according to claim 1 wherein an alkaline metal component is injected into said formation along with said polymer component and said surfactant component.

3. The method according to claim 2 wherein said alkaline metal component comprises at least one alkali metal salt of a weak acid.

4. The method according to claim 3 wherein said alkaline metal component is sodium hydroxide.

5. The method according to claim 1 wherein said surfactant component is selected from the group consisting of alkyl aromatic sulfonates; olefin sulfonates; branched or linear alcohol alkoxylates, sulfonates, sulfates, or carboxylates; and alkoxylated alkyl phenols.

6. The method according to claim 1 wherein said surfactant component is a polyoxyalcohol sulfate surfactant.

7. The method according to claim 1 wherein said polymer component is selected from the group consisting of galactomannan polymers; derivatized galactomannan polymers; xanthan gums; hydroxycelluloses; hydroxyalkyl celluloses; polyvinyl alcohol polymers; and polymers that are the product of a polymerization reaction comprising one or more monomers selected from the group consisting of vinyl pyrrolidone, 2-acrylamido-2-methylpropanesulfonic acid, acrylic acid and acrylamide.

8. The method according to claim 7 wherein said polymer component is a poly-acrylamide polymer or a derivative thereof.

9. The method according to claim 1 wherein said means in step c includes adjusting the conditions of at least one of (1) temperature, (2) pH, (3) salinity, and (4) pressure.

10. The method according to claim 1 wherein said means in step c includes a chemical means and a physical means.

11. A method of recovering petroleum oil from a subterranean, petroleum-containing, porous formation, penetrated by at least one injection well and by at least one production well, said petroleum-containing formation having been previously subjected to at least primary recovery operations, comprising:
  a. injecting into said injection well an aqueous solution containing a polymer component and a surfactant component resulting in the creation of a continuous organic phase and a continuous aqueous phase in the formation, wherein said surfactant component is capable of reducing the interfacial tension between the continuous organic phase and the continuous aqueous phase to less than 1 dyne/cm;
  b. recovering from the production well a portion of the organic phase and aqueous phase containing at least a portion of polymer and surfactant components that are not adsorbed or consumed in the formation along with a portion of native petroleum surfactants generated in the porous formation;
  c. adjusting the conditions of the recovered organic phase and aqueous phase in order to force at least a portion of the polymer component and surfactant component from the aqueous phase into the organic phase by use of chemical, physical, electrical or gravitational means or a combination of said means;
  d. separating the resulting organic phase;
  e. washing the separated organic phase with fresh water in order to remove a majority of the polymer components and surfactant components from the organic phase into the resulting water phase;
  f. separating the resulting water phase containing the polymer components and surfactant components from the organic phase;
  g. concentrating the polymer components and surfactant components in said separated water phase to the desired concentration; and
  h. re-injecting at least a portion of the concentrated polymer components and surfactant components into the injection well.

12. The method according to claim 11 wherein an alkaline metal component is injected into said formation along with said polymer component and said surfactant component.

13. The method according to claim 12 wherein said alkaline metal component comprises at least one alkali metal salt of a weak acid.

14. The method according to claim 13 wherein said alkaline metal component is sodium hydroxide.

15. The method according to claim 11 wherein said surfactant component is selected from the group consisting of alkyl aromatic sulfonates; olefin sulfonates; branched or linear alcohol alkoxylates, sulfonates, sulfates, or carboxylates; and alkoxylated alkyl phenols.

16. The method according to claim 11 wherein said surfactant component is a polyoxyalcohol sulfate surfactant.

17. The method according to claim 11 wherein said polymer component is selected from the group consisting of galactomannan polymers; derivatized galactomannan polymers; xanthan gums; hydroxycelluloses; hydroxyalkyl celluloses; polyvinyl alcohol polymers; and polymers that are the product of a polymerization reaction comprising one or more monomers selected from the group consisting of vinyl pyrrolidone, 2-acrylamido-2-methylpropanesulfonic acid, acrylic acid and acrylamide.

18. The method according to claim 17 wherein said polymer component is a poly-acrylamide polymer or a derivative thereof.

19. The method according to claim 11 wherein said means in step c includes adjusting the conditions of at least one of (1) temperature, (2) pH, (3) salinity, and (4) pressure.

20. The method according to claim 11 wherein said means in step c includes a chemical means and a physical means.

* * * * *